Oct. 13, 1964  C. E. MARGALA  3,152,837
DUMPING SEMI-TRAILER
Filed April 10, 1962
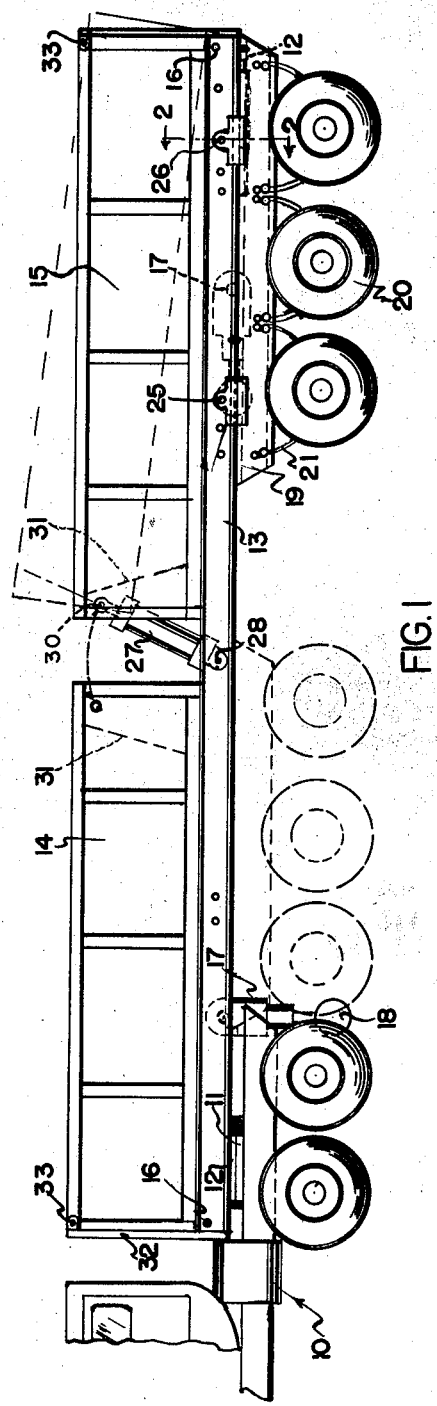
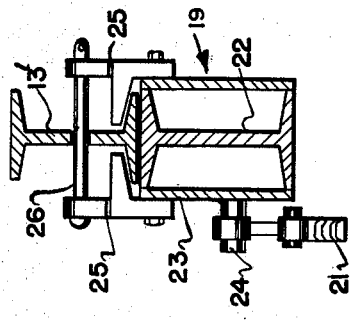
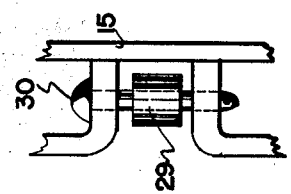
INVENTOR.
CHARLES E. MARGALA
BY
*Francis J. Klempay*
ATTORNEY

United States Patent Office 3,152,837
Patented Oct. 13, 1964

3,152,837
DUMPING SEMI-TRAILER
Charles E. Margala, 2610 Hubbard Road,
Youngstown, Ohio
Filed Apr. 10, 1962, Ser. No. 186,475
4 Claims. (Cl. 298—8)

This invention relates to highway equipment for hauling granulous loads such as coal, slag, sand and gravel, for example, which may be dumped directly from a hauling body into a bin or chute or onto the ground. Semi-trailers carrying tiltable bodies for dumping have heretofore been widely used for this purpose but serious difficulties arise when the attempt is made to make these rigs in large sizes so as to haul greater loads while yet complying with the axle spacing requirements and axle loading limitations imposed by most state highway systems. These regulations, commonly referred to in part as "bridge formulas" require a minimum spacing between the principal load-carrying axles or groups of axles if the maximum permissable gross vehicle weight (rig and load) is to be utilized for the most economical hauling of the goods. Conflicting with this formula is the commonly imposed limitation on the overall length of the combined tractor-trailer rig. The best overall arrangement is to make the trailer quite long—placing its supporting axles rather close to the rear end thereof and to use a cab-over-engine tractor wherein the distance between the front end of the trailer and the front bumper of the tractor is rather short. Many rigs having a trailer length of 40 feet and a tractor requiring only ten additional feet are in common use.

The upward tilting of long loaded dump bodies— of the order of 38 feet in length, for example, while presently practiced, is a dangerous maneuver since the substantial raising of the weight of the load and body greatly increases the lateral instability of the assembly, and serious accidents often result. The instability arises from the accumulative increase in loading on the springs and tires on one side or the other of the assembly as the elevated load begins to totter or move in either direction (even slightly) from a vertical plane passing longitudinally through the center of the undercarriage of the rig. Further, since the free end of the body must be moved through a substantial arc to effect sliding movement of the granulous material in the body and since very heavy loads are involved, the lifting equipment (commonly a telescoping cylinder) must be of large, heavy and expensive construction. Also, these long dumping bodies require a much heavier construction to provide adequate beam strength between the pivotal point and the tilting force, and greater head room is required for dumping.

The principal object of the present invention is to provide a self dumping rig for highway use which will permit of the haulage of the maximum possible load while yet complying with all known highway regulations, while reducing the cost and complexity of such equipment, and while enabling the loads to be safely dumped at their destination with a minimum of head room required. These objects are accomplished by my invention by providing a double-ended semi-trailer which may be drawn in either direction by a highway tractor—the undercarriage being shiftable with respect to the main frame of the trailer so that the road wheels and axles may always be positioned toward the rear of the trailer—and by mounting two separate and distinct road-carrying bodies on the main frame of the trailer pivoted to the ends of said main frame whereby the bodies may be tilted upwardly for dumping. With this arrangement the bodies are relatively short, they may be made of light construction, the lifting or tilting device remain simple and inexpensive, and a minimum of head room is required for dumping. Further, and of greater importance, is the advantage that the rig retains maximum lateral stability while the loads are being dumped. Only half the total load is raised only half the distance for dumping, and while one body is being tilted the other remains in lowermost horizontal position to lend maximum stability to the assembly by reason of the fact that a much lower composite center of gravity is retained at all times. This result is aided, of course, by the weight of the horizontal body and its load, if not yet emptied.

A further object of the invention is the provision in an assembly of the kind described above of an arrangement whereby a single, small and inexpensive hydraulic lifting cylinder may be employed for alternate use on the two dumping bodies of the assembly.

The above and other objects and advantages of the invention will become apparent upon consideration of the following specification and the accompanying drawing wherein there is disclosed a preferred embodiment of the invention.

In the drawing:

FIGURE 1 is a side elevation of a dumping semi-trailer constructed in accordance with the principles of the present invention;

FIGURE 2 is a fragmentary sectional view taken along the line 2—2 of FIGURE 1; and FIGURE 3 is a view of a detail of the dumping cylinder rod end connection assembly of FIGURE 1.

As explained initially above, the assembly of my invention comprises a double-ended semi-trailer, either end of which may be connected to a motor-driven tractor shown schematically at 10. The tractor will preferably have tandem rear axles and in any case will be provided with a fifth wheel 11 adapted to coact with either one of a pair of fifth wheel plates 12 which are mounted on the underside of the frame 13 of the trailer at either end thereof. The fifth wheel 11 and plates 12 may be of more or less conventional construction such as shown in U.S. Patent No. 2,317,508. Thus, the wheel 11 will be tiltable, slotted and provided with a lock while the plates 12 will have a centrally located depending pin which enters the slot and is held by the locking device whereby the tractor and trailer is swivelably connected together. It is also well known in the art that the aforesaid tilted feature enables the tractor to be backed up under the forward ends of the trailer to make the connection between the units.

The frame 13 of the illustrated trailer has a pair of spaced parallel side rails in the form of I-beams 13' as shown in FIGURE 2. Frame 13 is a rigid structure rectangular in plan on which is mounted a pair of load-carrying bodies 14 and 15 which are pivotally connected to the ends of the rails 13' as shown at 16 so that these bodies may be tilted upwardly to dump the loads therein. Frame 13 also mounts a pair of hydraulic or screw actuated landing gears 17 which mounts small wheels 18 for engaging the ground or roadbed when the landing gears 17 are swung to vertical positions and extended. Again, the units 17, 18 are of standard construction and are well known in the highway semi-trailer art. Suitable means, not shown, is employed to swing the units up into retracted position between the side rails of the frame 13 and, when desired, to position either of the units in vertical operative position as shown on the left of FIGURE 1.

The trailer of the invention is, in its illustrated and preferred embodiment, supported on a triple-axle undercarriage comprised of a frame 19, and road-engaging wheels 20 carried on suitable axles, not shown, suspended from leaf springs 21. Referring now to FIGURE 2, the frame 19 is formed with a pair of spaced parallel side rails 22 in the shape of I-beams which are vertically aligned with and below the I-beams 13' of the main trailer frame. Rigidly welded on the outer face of each of the beams 22 is a plate 23 to which the ends of the leaf springs 21 are pivotally attached as shown at 24. Also carried by the beams 22 are cleats 25 which engage over the bottom flanges of the I-beams 13'. Cleats 25 are rigidly connected to the beams 22 so that the frame 19 is guided for sliding longitudinal movement along the underside of the beams 13'. To secure the frame 19 in desired position with respect to the frame 13, I provide one or more retractable pins 26 which passes through apertures in the cleats 25 and suitable apertures formed in the webs of the I-beams 13'.

The undercarriage comprised of the wheels 20 will be provided with the well known "fail-safe" type of air brakes which will be controlled from within the cab of the tractor 10 and which are operative to lock the wheels 20 upon the air line between the tractor and the trailer being disconnected. This arrangement enables the power of the tractor 10 to be utilized to slideably shift the undercarriage comprised of the frame 19 and wheels 20 along the frame 13 when it is desired to move the tractor from one end of the trailer to the other. Assuming that the rig has arrived at the dumping site with the tractor under the load body 14 the body 15 is first dumped by upward tilting of its inner end. This dumping is accomplished by a cylinder 27 (preferably of the telescoping type) which is pivotally mounted on the frame 13 at 28 and which has its rod end 29 pivotally connected to the inner end portion of the body 15 by means of a retractable pin 30. See FIGURE 3. The inner end portion of both the bodies 15 and 14 are formed with recesses or housings 31 which provide space for the cylinder 27 as the bodies are tilted upwardly. The same cylinder 27 is used to dump both bodies 14, 15, it being obvious that upon retraction of pin 30 the cylinder 27 may be swung above pivot 28 from one body to the other. Suitable power means, not shown, may be employed to so swing the cylinder 27 since this equipment is rather heavy and may present a rather difficult manual handling problem.

Assuming, as above, that the body 15 has been raised and then lowered by the cylinder 27 to discharge the load therein, that both landing gears 17 have been retracted, that the pin or pins 26 have been withdrawn, and that the air line to the undercarriage 19, 20 has been disconnected, it should be obvious that upon applying tractive power to the tractor 10 in a reverse direction the frame 13 will slide rearwardly over the frame 19 to a position wherein the relative position of the parts would be as shown at dotted lines in FIGURE 1. At this time or before the final relative position has been reached the right landing gear 17 may be swung downwardly, if desired, to stabilize the structure upon the subsequent removal of the tractor 10 although it should be obvious that all or practically all of the weight of the trailer and its remaining load would be borne by the undercarriage 19-21. In any event, the right end portion of the trailer will remain cantilevered out in free condition so that the tractor may be readily connected to this end after being withdrawn from the left end.

Upon the tractor being connected and locked to the right end of the trailer before the air lines have been reconnected (the road wheels 20 remaining locked) forward movement of the tractor will pull the frame 13 further over the frame 19 to thus place the extreme left end portion of the trailer over this undercarriage as is desirable for dumping of the body 14 and also normally desirable for road travel. The pin or pins 26 are then reinserted in suitable apertures formed in the I-beams 13' and the cylinder 27 is swung from body 15 to body 14 and connected to the latter by pin 30. The load in body 14 may now be dumped and the body lowered so that upon the air line being reconnected the entire rig is immediately ready for being returned to its loading point.

In accordance with usual practice, the dumping ends of the bodies 14 and 15 will each be provided with a tail gate 32 which is hinged to the bodies at 33 and which is provided with suitable releasable locking means, not shown, whereby upon loading and in transit the dumping ends of the bodies will be held closed.

It should now be apparent that I have provided an improved dumping semi-trailer for use with highway tractors of conventional design which accomplishes the objects initially set out. The invention provides a wholly practical and safe arrangement for adapting a highway semi-trailer of maximum allowable length and load capacity to the hauling of such materials as coal, sand gravel, etc. which are to be automatically unloaded at their points of delivery. Since the load-bearing bodies 14 and 15 are each only approximately half the overall length of the trailer the bulk and mass of their structures and contained loads do not rise an appreciable distance for dumping and consequently there is no danger of the trailer overturning sideways. This stability is further enhanced by the low center of gravity of that body (with or without its load) which remains horizontal while the load in the other body is dumped. Another significant and unobvious advantage of the arrangement is the fact that the very extreme downward thrust imparted through the pivot pins of large and heavily loaded dumping (tilting) bodies is very materially reduced by this invention and, moreover, this downward thrust is more effectively resisted by the heavy undercarriage used on semi-trailers of maximum length and capacity. Also, since the load distribution and manipulation permits the undercarriage to be positioned at the extreme rear of the trailer for highway travel very heavy loads may be transported without violating the bridge-load limitation formulas imposed on practically all highway systems.

It should be further apparent that all of the above advantages are obtained by this invention without adding appreciably to the cost of the semi-trailer. As stated above, the load-carrying bodies may be of lighter and cheaper construction, and the lift cylinder 27 may remain quite small and inexpensive. These cost advantages may well outweigh the expense of making the undercarriage slideable and of providing the additional fifth-wheel bolster plate and the extra landing gear.

The above specifically described and illustrated embodiment of the invention is intended only to explain the principle of the invention, and obviously various changes may be made in the specific embodiment without departing from the invention. Reference should therefore be had to the appended claims in determining the scope of the invention.

I claim:

1. A dumping semi-trailer for highway use comprising a rigid elongated frame having a fifth-wheel bolster plate under both ends thereof for alternate connection to a fifth-wheel of a highway tractor, an undercarriage comprised of a unitary assembly of a sub-frame, springs, axles, and road engaging wheels for supporting at least a portion of the first mentioned frame on the highway, said first mentioned frame being slideable longitudinally on said sub-frame, means to releasably lock said first mentioned frame and said sub-frame in adjusted relative position, a pair of tandem related dump bodies mounted on said first mentioned frame and pivotally connected to the ends of said first mentioned frame, releasable tail gates on the ends of said bodies adjacent the axes of pivotal connection of the bodies to said first frame, means to selectively tilt said bodies upwardly about said axes to dump the loads therefrom through said tail gates, said means to tilt said bodies comprising a hydraulic cylinder pivotally mounted on the first mentioned frame for swinging movement about a horizontal axis extending transversely of the principal axis of the first mentioned frame and substantially intermediate the ends of the first mentioned frame, said cylinder having an upwardly extending rod, and means on the upper end of said rod and on the inner end of each of said bodies to provide a pivotal interconnection between said rod and either of said bodies, the arrangement being such that said cylinder may be disconnected from one of the bodies after dumping the same and connected to the other body for dumping the latter.

2. A dumping semi-trailer for highway use comprising a rigid elongate frame, a pair of tandem related dump bodies supported on said frame and having horizontal pivotal connection with end portions of said frame as well as having releasable tail gates at their ends which coincide with said end portions of said frame whereby said bodies may be selectively tilted upwardly about horizontal transverse axes for dumping over the ends of said frame, said frame having spaced parallel side rails extending throughout the length of the trailer, an undercarriage comprised of a sub-frame means mounting at least one transverse axle carrying a pair of road-engaging wheels slideably longitudinally with respect to the elongated frame, means to secure said sub-frame means in selected position with respect to said elongated frame, a fifth-wheel bolster plate under each end portion of said elongated frame and positioned between said side rails whereby said sub-frame means may be located substantially under one extreme end portion of said elongated frame while the other end portion thereof is supported on the fifth wheel of a highway tractor, and means carried by said elongated frame to selectively tilt said bodies upwardly about said axes to dump the loads therefrom through said tail gates.

3. A semi-trailer according to claim 2 further characterized in that said sub-frame means mounts a plurality of transversely extending road-wheel axles, said axles having wide longitudinal spacing sufficient when properly positioned with respect to said elongated frame to support the trailer in horizontal "at-rest" position without the aid of the tractor.

4. A dumping semi-trailer for highway use comprising a rigid elongated frame having a fifth-wheel bolster plate under both ends thereof for alternate connection to a fifth-wheel of a highway tractor, an undercarriage comprised of a unitary assembly of a sub-frame, springs, axles, and road engaging wheels for supporting at least a portion of the first mentioned frame on the highway, said first mentioned frame being slideable longitudinally on said sub-frame, means to releasably lock said first mentioned frame and said sub-frame in adjusted relative position, a pair of tandem related dump bodies mounted on said first mentioned frame and pivotally connected to the ends of said first mentioned frame, releasable tail gates on the ends of said bodies adjacent the axes of pivotal connection of the bodies to said first frame, means to selectively tilt said bodies upwardly about said axes to dump the loads therefrom through said tail gates, a landing gear mounted at either end of the first mentioned frame inwardly of the fifth-wheel bolster plates, said landing gears being pivotally mounted on said first mentioned frame whereby they may be moved into retracted positions within said first frame to provide clearance for said sub-frame, and means to elongate and shorten said landing gears when in vertical position to raise or lower an end of the first frame to facilitate interconnection of the bolster plate at said end with the fifth-wheel of a tractor.

References Cited in the file of this patent
UNITED STATES PATENTS

| | | |
|---|---|---|
| 1,554,608 | Van Ryzin | Sept. 22, 1925 |
| 2,703,659 | Hutchins | Mar. 8, 1955 |
| 2,770,490 | Hockensmith | Nov. 13, 1956 |
| 2,787,971 | Obes | Apr. 9, 1957 |
| 2,850,330 | Andrews | Sept. 2, 1958 |
| 2,906,213 | Bonanno | Sept. 29, 1959 |
| 2,929,658 | Killebrew | Mar. 22, 1960 |
| 2,986,408 | Black | May 30, 1961 |